J. J. NOONAN.
LATHE TOOL HOLDER.
APPLICATION FILED APR. 16, 1914.
1,128,714.
Patented Feb. 16, 1915.
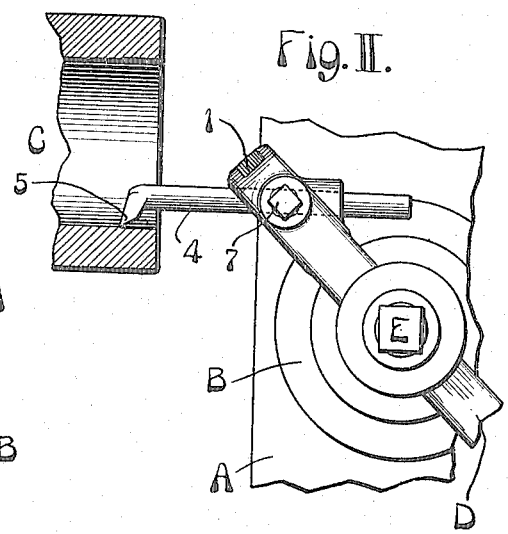
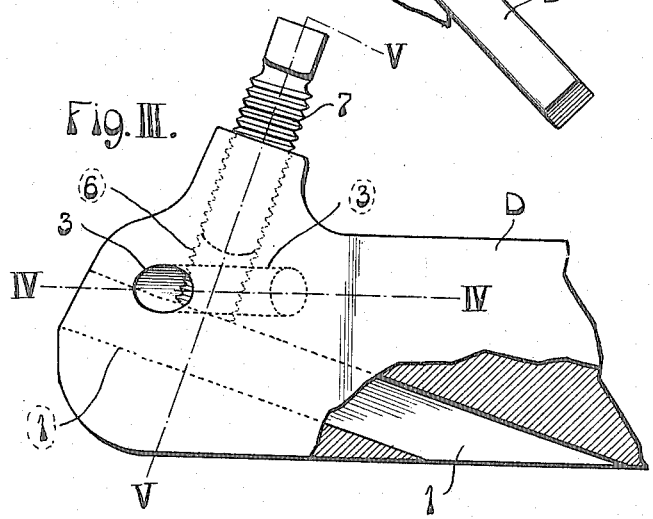
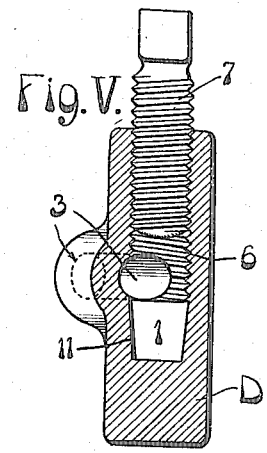
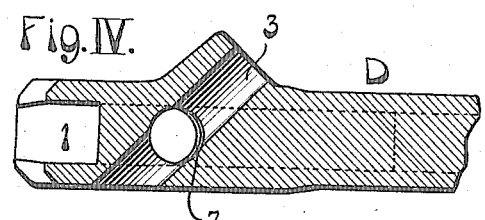
Attest
a. J. McCauley
M. M. Apgar
Inventor:
J. J. Noonan
by Knight & Cook Att'ys.

UNITED STATES PATENT OFFICE.

JOHN J. NOONAN, OF ST. LOUIS, MISSOURI.

LATHE-TOOL HOLDER.

1,128,714.   Specification of Letters Patent.   Patented Feb. 16, 1915.

Application filed April 16, 1914. Serial No. 832,254.

*To all whom it may concern:*

Be it known that I, JOHN J. NOONAN, a citizen of the United States of America, and a resident of the city of St. Louis and State of Missouri, have invented certain new and useful Improvements in Lathe-Tool Holders, of which the following is a full, clear, and exact description, reference being had to the accompanying drawings, forming a part of this specification.

My invention relates to a lathe tool holder, and it has for one of its objects the production of a tool holder of this kind adapted to receive either a turning tool or a boring tool.

Prior to this invention lathe tools and holders therefor have been so constructed that considerable time is consumed in removing a turning tool from a lathe, and readjusting the parts to receive a boring tool. These two different tools are usually supported by separate and distinct holders, each of which must be accurately positioned to locate the tool in its proper position with respect to the work. To bore a cylindrical object after its periphery and end have been finished by a turning tool, it is necessary to remove the turning tool and to thereafter carefully adjust certain parts of the lathe to receive the boring tool.

My improved lathe tool holder is preferably so constructed that it constitutes a support for a turning tool which may be readily removed from the holder, and also constitutes a support for a boring tool which may be readily secured to the holder after the removal of the turning tool. One tool may be substituted for another without in any way changing the relative positions of the tool holder and its support, or both tools may be held in the holder at the same time. The tool holder may be primarily positioned so that it will hold either of the tools in its proper position with respect to the work.

Figure I is a top or plan view of my lathe tool holder showing a portion of a lathe and a fragment of the work mounted in the lathe, a turning tool being shown in the full lines with its point against the end of the work and a boring tool being shown in dotted lines. Fig. II is a view similar to Fig. I, showing the boring tool secured to the holder. Fig. III is a side elevation, partly in section, of an end portion of my lathe tool holder. Fig. IV is a horizontal section taken approximately on the line IV—IV, Fig. III. Fig. V is a section taken approximately on the line V—V, Fig. III.

In the accompanying drawings:

A designates a cross slide adapted to be moved on a lathe in the direction indicated by either of the arrows in Fig. I.

B designates a tool post carried by the cross slide and C is the work or object to be finished by the lathe tools. The work may be rotated in any suitable manner and any suitable means may be utilized to shift the cross slide A.

My lathe tool holder preferably comprises a bar D mounted in the tool post B and secured thereto by a set screw E. An opening 1 for the reception of a turning tool 2 is formed in an end of the bar D, the walls of said opening being inclined upwardly toward the end of the bar, as seen most clearly in Fig. III. The turning tool 2, arranged in said opening and seated on one of the inclined walls, is inclined so that its outer end extends upwardly from the end of the bar D. The point of the turning tool preferably lies in the same horizontal plane as the center line of the work C. An upper opening 3 is formed in the bar D at an acute angle to the side face of the bar D and at a point above the lower opening 1. This upper opening is adapted to receive a boring tool 4, which may extend entirely through the bar D, as shown in Fig. II. The boring tool 4 is preferably a horizontal bar or rod extending from the side of the bar D and terminating in a cutting point 5. The bar D is provided with a threaded opening 6, which communicates with both of the tool receiving openings 1 and 3, and a set screw 7 arranged in the threaded opening may be adjusted to secure either of the tools 2 and 4 to the bar D.

When the parts occupy the position seen in Fig. I the cross slide A may be shifted to carry the turning tool 2 across the end of the work or along the periphery of the work.

After the turning tool has served its purpose it is removed by loosening the set screw 7 and withdrawing the said tool from the opening 1. The boring tool 4 is then inserted in the transverse upper opening 3 and secured by the set screw 7. When the boring tool is so located its point lies in substantially the same horizontal plane as the center line of the work. In other words the point of the boring tool lies in the horizontal plane formerly occupied by the turning tool, this being due to the relative locations of the tool receiving openings 1 and 3.

It will be understood that the turning tool, when arranged in the lower opening, extends upwardly from the end of the bar D, and that the boring tool located in the horizontal upper opening 3 is positioned so that its point will lie in the horizontal plane occupied by the turning tool. Owing to the relative positions of the tool receiving openings the tool holder may be adjusted to a fixed position in the tool post and when so adjusted it is properly located to receive either the turning tool or the boring tool.

The tool receiving openings 1 and 3 communicate with each other, as shown most clearly in Fig. V, so that both tools may be secured to the holder at the same time. The set screw 7 is located directly above both of the openings 1 and 3 and when both tools are applied to the holder, the set screw may be engaged with the boring tool 4 in the opening 3 so as to force said boring tool into engagement with the turning tool in the opening 1. When both tools are secured to the holder their cutting points lie in the same horizontal plane, and the work of facing, turning and boring the work may be completed without removing either tool and without adjusting the tool holder.

I claim:—

1. A lathe tool holder having a longitudinal lower opening formed in its end face, said longitudinal lower opening being so formed that a turning tool seated on its walls will extend upwardly from the end of the holder, said tool holder also having a substantially horizontal transverse upper opening formed in its side face and located above said lower opening, so that a substantially horizontal boring tool located in said horizontal transverse upper opening will extend from the side of the holder into the same horizontal plane as the point of a turning tool in said lower opening, and means for securing said tools in said openings.

2. A lathe tool holder having a longitudinal lower opening formed in its end face, said longitudinal lower opening being so formed that a turning tool seated on its walls will extend upwardly from the end of the holder, said tool holder also having a substantially horizontal transverse upper opening formed in its side face and located above said lower opening, so that a substantially horizontal boring tool located in said horizontal transverse upper opening will extend from the side of the holder into the same horizontal plane as the point of a turning tool in said lower opening, the horizontal transverse upper opening being formed at an acute angle to the side of said holder, and means for securing said tools in said openings.

3. A lathe tool holder having a lower opening for the reception of a turning tool, and also having an upper opening adapted to receive a boring tool, said openings being in communication with each other, so that the boring tool arranged in said upper opening will engage the turning tool arranged in said lower opening, and a set screw for forcing said boring tool into engagement with said turning tool so as to secure both of said tools to the holder.

4. A lathe tool holder having a lower opening for the reception of an inclined turning tool, and also having a transverse upper opening formed in its side face and adapted to receive a substantially horizontal boring tool, said openings being so formed that the point of the turning tool will lie in substantially the same horizontal plane as the point of the boring tool and said openings being in communication with each other so that a horizontal boring tool arranged in said transverse upper opening will engage the top face of an inclined turning tool located in said holder opening, and a set screw adapted to engage the boring tool so as to clamp both of said tools to said holder.

5. A lathe tool holder adapted to be secured to the tool post of a lathe, said holder having a lower opening formed in one of its ends for the reception of a turning tool, said lower opening having a wall serving as a seat for the turning tool so that the latter will extend upwardly from the end of said holder, and the said holder being provided with a transverse upper opening located above said lower opening, said openings being so formed that the point of an inclined turning tool located in said lower opening will lie in substantially the same horizontal plane as the point of a boring tool located in said transverse upper opening, and means for securing said tools to said holder.

6. A lathe tool holder provided with a lower opening for the reception of a turning tool, said opening being so formed that a tool seated against its walls will extend upwardly from the end of the holder, the said holder also having a transverse upper opening for the reception of a boring tool which, when arranged in said transverse upper opening, will extend from one side of said holder, said transverse opening being so formed above the lower opening that the point of a boring tool supported in said upper opening will lie in substantially the same horizontal plane as the point of a turning tool supported in said lower opening, and means for securing such tools to the holder.

JOHN J. NOONAN.

In the presence of—
E. K. CLARK,
A. J. McCAULEY.

Copies of this patent may be obtained for five cents each, by addressing the "Commissioner of Patents, Washington, D. C."